May 9, 1944. H. E. SCHABACKER 2,348,696
METHOD OF FORMING TANKS
Filed Sept. 19, 1941 2 Sheets-Sheet 1

INVENTOR
Henry Emil Schabacker
BY
ATTORNEYS

May 9, 1944.  H. E. SCHABACKER  2,348,696
METHOD OF FORMING TANKS
Filed Sept. 19, 1941   2 Sheets-Sheet 2

Patented May 9, 1944

2,348,696

UNITED STATES PATENT OFFICE 2,348,696

METHOD OF FORMING TANKS

Henry Eric Schabacker, Erie, Pa., assignor to The Erie Enameling Company, Erie, Pa., a corporation of Pennsylvania Application September 19, 1941, Serial No. 411,548

1 Claim. (Cl. 29—84)

This invention relates to a method of forming tanks.

As exemplified, the tank is coated with vitreous enamel and the method employed in forming the tank contemplates using the vitreous enamel for sealing the joint between the head and wall of the tank. Preferably this is accomplished by assembling the head and wall while the wall is still hot from the final firing of the enamel and the enamel is still in a state of flux and of a sufficiently high temperature to flux and merge with an enamel coating on the head. With this method, the wall, while still hot from the firing, is expanded so that the ready assembly of the head and wall may be accomplished. As the wall cools and the enamel sets, the wall shrinks, thus forcing a more definite union between the enamel of the head and the enamel of the wall so as to definitely and completely seal the point. Upon the completion of the tank, the enamel in the joint is subjected to high pressure due to the shrinkage of the outer member, thus making more certain a continuation of a completely sealed and protected joint.

Features and details of the invention will appear from the specification and claim.

Figure 1:
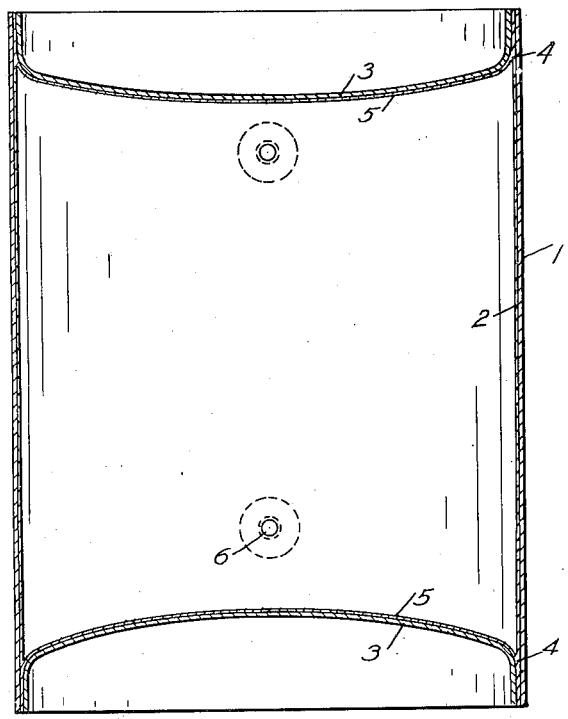

A preferred embodiment of the method of forming the tank is illustrated in the accompanying drawings as follows:

Fig. 1 shows a central section through a tank.

Figure 2:
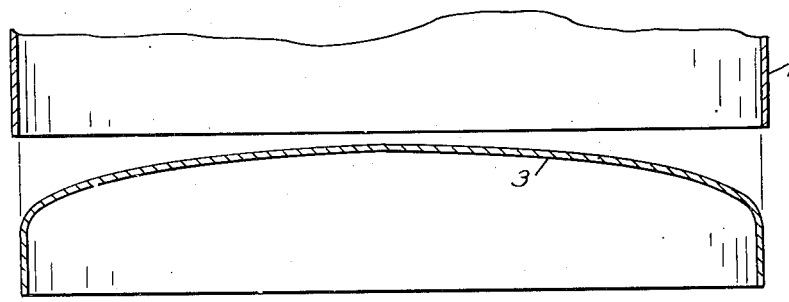

Fig. 2 a section of a head and portion of the tank prior to the enamel coating.

Figure 3:
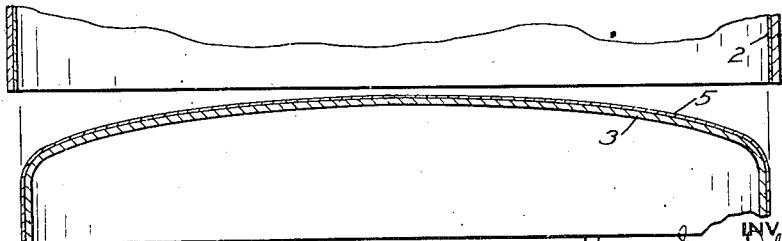

Fig. 3 a similar view including the enamel coating and with the wall in expanded relation.

Figure 4:
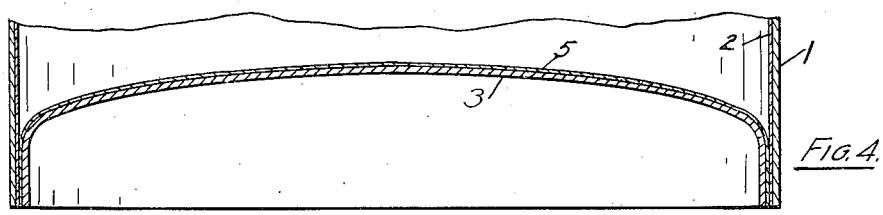

Fig. 4 a sectional view in which the head is assembled within the wall, but prior to the merging of the enamel and shrinking of the wall.

Figure 5:
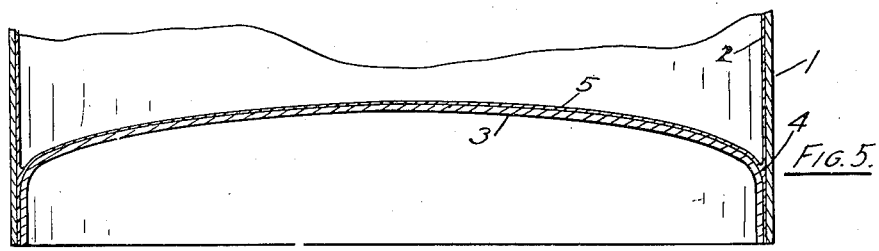

Fig. 5 a sectional view showing the final structure.

Figure 6:
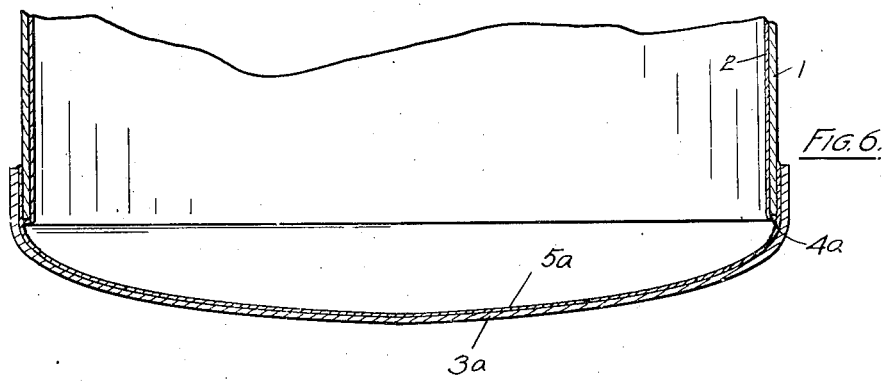

Fig. 6 shows an alternative construction.

1 marks a wall of a tank which ordinarily is formed of sheet metal. The inner surface of this wall is provided with a coating, preferably of vitreous enamel. A head 3 is also ordinarily of sheet metal and may be, and preferably is, formed with a flanged periphery and of dome shape for giving greater pressure capacity. The head is formed with a flange and in its final condition has a coating of enamel 5. The tank has the usual pipe openings 6.

In the preferred construction the head is assembled within the wall, although it may be, as shown in the alternative construction, Fig. 6, arranged with the flange outside of the wall.

The essentials are that the periphery of the head should present a surface contiguous to the wall and that the outer member shall be hot when assembled so as to be shrunk in place, thus condensing the enamel between the periphery of the head and the wall and through the heat of the outer member fusing the included enamel while forcing the softened enamel into more intimate contact and sealing relation with the engaged surfaces. The completed tank as cooled not only provides a more perfect sealing of the enamel initially, but the continued binding stress of the outer member makes more certain the continued engagement and sealing of the included enamel.

In forming the parts, as preferably practiced, one of the members, preferably the head, is enameled, fired and permitted to cool. The other member, preferably the wall, is coated in the usual manner and fired and the members are assembled with the last fired member still hot and with the coating in a state of flux. The temperature of the hot member and its coating will be sufficient to flux and merge with the coating of the cool member. The hot member, as it cools, shrinks and puts the included enamel under pressure, thus assuring a complete union and seal at the joint, the enamel being set and bonded to the surface of the metal and also subjected to the contraction of the shrinking member. The expansion of the hot member is such as to permit the ready assembly of the members.

Ordinarily the contiguous surfaces may be made of substantially the same diameter, the expansion being sufficient for the assembly. Where these dimensions are observed, there is a very definite final tension on the member which is shrunk to its final condition.

While the invention is specially suited to the use of vitreous enamel, in its broader aspects it is not limited to a coating of this type.

What I claim as new is:

The method of assembling vitreous enamel coated tanks having a wall member and a head member, said members having, when assembled, contiguous opposing peripheral vitreous enamel coated surfaces, which consists in heating the surface of the outer member only and sufficiently in relation to the cool head member to create an expansion of the outer member of such an order that the parts are readily assembled and that subsequent shrinking, upon cooling, will contract and densify the coating, assembling the members with the member so heated and the enamel in a condition of flux with the other member relatively cool and permitting the hot outer member to shrink into pressure relation with the vitreous enamel as the enamel sets by cooling while the members are in assembled position.

HENRY ERIC SCHABACKER.